Nov. 6, 1962     R. W. DOWLING ETAL     3,062,098
LENS COVERS FOR A BINOCULAR TELESCOPE
Filed Feb. 5, 1960     3 Sheets-Sheet 1

INVENTORS
ROBERT WHITTLE DOWLING
LORENZO del RICCIO
BY
ATTORNEYS

Nov. 6, 1962  R. W. DOWLING ETAL  3,062,098
LENS COVERS FOR A BINOCULAR TELESCOPE
Filed Feb. 5, 1960  3 Sheets-Sheet 2

INVENTORS
ROBERT WHITTLE DOWLING
LORENZO del RICCIO
BY
ATTORNEYS

Nov. 6, 1962    R. W. DOWLING ETAL    3,062,098
LENS COVERS FOR A BINOCULAR TELESCOPE
Filed Feb. 5, 1960    3 Sheets-Sheet 3

INVENTORS
ROBERT WHITTLE DOWLING
LORENZO del RICCIO
BY
ATTORNEYS

3,062,098
LENS COVERS FOR A BINOCULAR TELESCOPE
Robert Whittle Dowling, New York, N.Y., and Lorenzo del Riccio, Los Angeles, Calif., assignors to D & D Company, Inc., New York, N.Y., a corporation of Delaware
Filed Feb. 5, 1960, Ser. No. 6,962
Claims priority, application Germany Feb. 18, 1959
11 Claims. (Cl. 88—34)

This invention relates to a binocular telescope having sliding protective lens covers and more particularly to an opera and sporting event binocular having sliding lens covers which are automatically operated to uncover the lenses when the binocular is adjusted to accommodate the interpupillary distance of the viewer.

The lenses of binoculars, especially the objective lenses, are often damaged when the binocular is laid down without protective covers. They are also often damaged when carried unprotected in handbags and pockets which contain hard objects or, when carried on a strap, they may be damaged by buttons, buckles and the like.

In a theater or sporting event binocular telescope having a pair of ocular-objective lens systems arranged in lens casings which are slidably mounted on a connecting bridge type unitary support member, such as described in our copending application for "Binocular Telescope" Serial No. 783,977, filed December 30, 1958, the disadvantages described are particularly acute. This type of binocular telescope is normally closed and opened, lowered and raised and placed in the viewer's lap or pocket or handbag several times in the course of its use.

The present invention provides for automatic lens protection under such adverse conditions. It does so in such a manner that the lens covering devices are removed and recessed within lens casing enclosures whenever the binocular telescope is adjusted to an extended viewing position. The lens covers of this invention slide automatically from the closed position to the opened position as the lens casings are moved from the closed position to the viewing or operating positions and vice-versa.

In the binoculars described the interocular separation of the lens casings is variable to permit use by individuals having different interpupillary distances. With the lens covers of this invention, the lenses are fully exposed when the lens casings have been extended a minimum distance. This invention also provides for the lens covers to be locked in their opened positions when the casings are further extended throughout the operating range.

To do this a transmission mechanism is provided which controls the positioning of the lens covers. In accordance with the invention the transmission mechanism may comprise a swinging cam lever and mutually engaging slots and pins, or it may comprise a gear drive.

In accordance with a particular embodiment of the invention, a gear drive is supported in the lens casings interconnective of the lens cover, the casing and the central bridge support member. In this type drive, a rack is positioned on an outer corner of the central bridge. The rack engages a pinion on the lens casings as the casings are opened. The pinion rotates and actuates a gear train which in turn causes a transport wheel to open the lens cover.

The pinion and rack teeth are arranged so that the lens cover is completely opened and housed internal of the ends of the lens casing in response to a minimum initial casing separation and a corresponding small amount of pinion rotation. After this rotation is completed the pinion teeth are disengaged and remain out of mesh in all lens casing viewing positions.

For this purpose the pinion has teeth over only a portion of its periphery and has a cam surface over the remainder. After the lens casing has been extended to the minimum initial separation above mentioned, the cam surface slidably engages a glide plane. This sliding action stops further rotation of the pinion and of gear wheels in the drive. The lens cover thus becomes cam controlled and is locked open in all binocular viewing attitudes.

Similar lens cover control may be obtained with cable or chain mechanisms but the gear arrangement described is preferred because it is positive acting and free of backlash.

According to this invention the lens covers comprise multiple louvered shutters. The shutters have a series of louver slats fastened to a flexible mounting tape. The shutters are supported on internal guides arranged in the lens casings to keep the covers from jamming or otherwise interfering.

In a particular embodiment of the invention the shutters are moved by the transport wheel of the transmission mechanism. The slats are alternately arranged so as to mesh with peripheral teeth on the transport wheel and the shutter is opened or closed in response to transport wheel rotation.

In accordance with an alternate embodiment of the invention a swinging cam lever is pivoted on the lens casing. The cam lever has a control slot in it and a drive pin on one end. The control slot engages a control pin, mounted on the central bridge. The drive pin engages a drive slot in the end of the lens cover. As the lens casings are extended, the cam lever is caused to rotate about its pivot by the control pin which slides in a curved portion of the control slot. As the cam lever rotates the drive pin moves in the drive slot so as to pull the cover away from the lens opening.

The control slot is arranged so that the lens cover is completely opened and housed internal of the sides of the lens casing in response to a minimum initial casing separation. After the covers are opened the control pin slides into an oblong portion of the control slot of the cam lever. The oblong portion is then disposed parallel to the direction of lens casing extension and rotation of the cam lever is stopped. The control pin thus slides in the said oblong portion of the control slot and the lens cover is locked open throughout all lens casing viewing positions.

This arrangement may also be such that the drive pin is mounted on the lens cover. In such a case, the drive slot is presented in the cam lever.

The automatic lens covers provided by this invention assure that valuable optical lens systems will not be scratched or broken during normal binocular handling. Moreover, lens protection is automatically provided during intermittent periods of use. This is advantageous in crowded or darkened situations where the viewer is not free to use his hands to manipulate lens covers.

With this invention the binocular may be closed and confidently inserted into any convenient carrying container. Yet, very advantageously, the viewer's time and attention are not required for positioning and removal of lens covers.

These and other features of the invention are described so that they may be fully understood by those skilled in the art, in the following portion of the specification. For clarity, reference will be made to the drawings in which.

Figure 1:
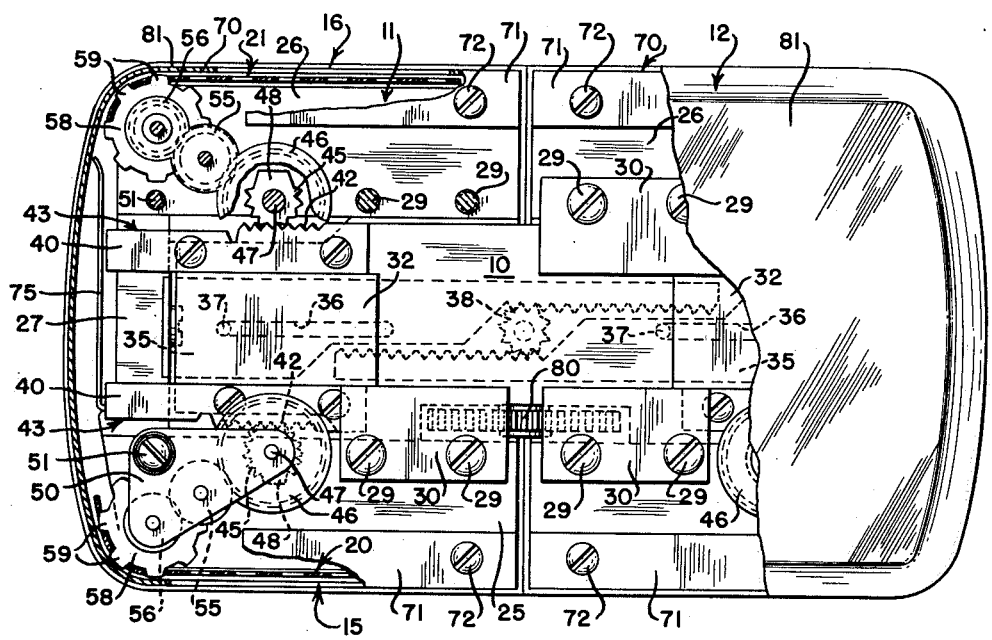
FIG. 1 is a plan view of the binocular telescope in the closed position, with the cover of one lens casing wholly and that of the other partly broken away showing individual parts.
Figure 2:
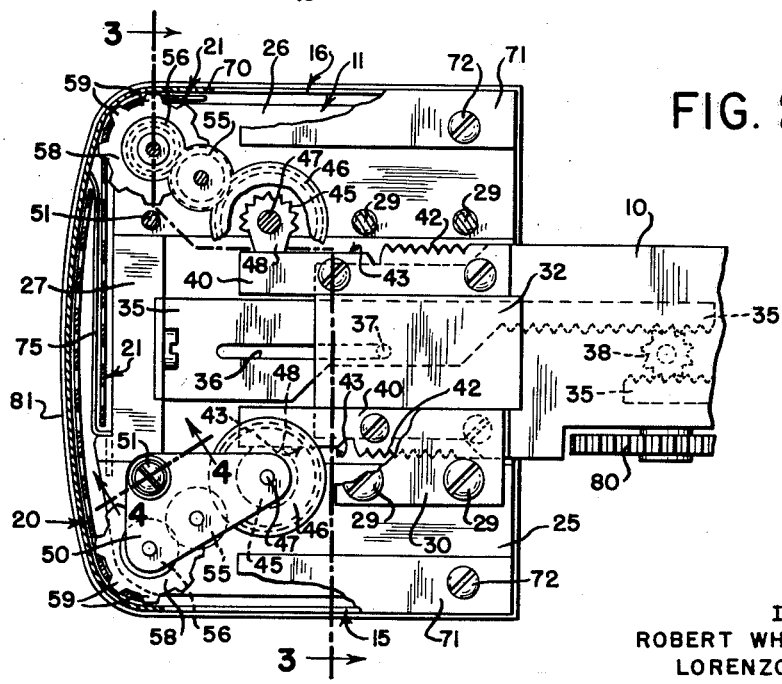
FIG. 2 is a plan view of one of the lens casings in opened position with the cover thereof broken away.
Figure 3:
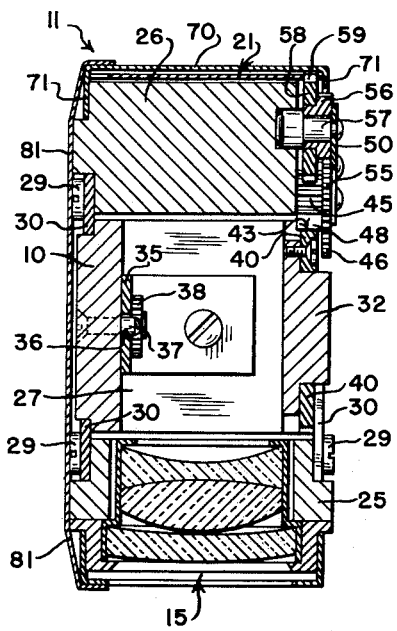
FIG. 3 is a section along line 3—3 in FIG. 2.
Figure 4:
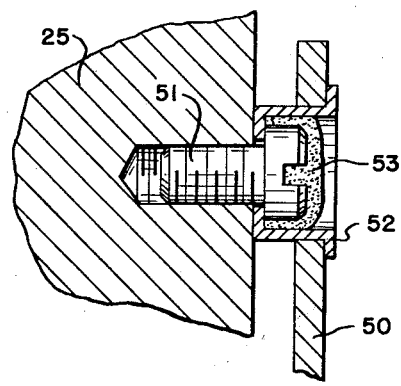
FIG. 4 is a partial section along line 4—4 in FIG. 2.

Referring to the drawings and particularly to FIGS. 1-7, the binocular telescope comprises two lens casings 11 and 12 that are slidably arranged on a central bridge support member 10 (shown only in FIGS. 1 to 3). The objective openings 15 and the eyepiece openings 16 are covered with louver shutter type lens covers 20 and 21, respectively, whose slats are disposed perpendicularly of the plane of the binocular telescope optical axes.

Each of the lens casings comprises side parts 25 and 26, and a front part 27. Screwed to the side parts by means of screws 29 are guide members 30 which abut on guide blocks 32 of the unitary support member 10.

Four rack and glide plane strips 40 are screwed to the outer corners of support 10. The said strips 40 present working surfaces which engage pinion 45. As seen, the working surfaces are disposed at the outer (as determined relative to the optical axis directions) edge of each strip substantially parallel to the central bridge support member 10. From the inner ends of the strips 40 to a point approximately mid-way thereof the said working surfaces comprise gear teeth 42. The outer end portions of the working surfaces comprise a glide plane 43 whose function will be explained subsequently.

Teeth 42 of each strip 40 mesh with pinion gear 45. Pinion 45 is integral and coaxial with an actuating gear 46. Rotatable actuating gear 46, idler gear 55 and receiving gear 56 comprise a gear train which translates rotary motion of the pinion to a transport wheel 58. Receiving gear 56 and the transport wheel are also coaxial.

The pinion and actuating gear shaft 47 is supported on mounting plate 50. The mounting plate also supports the other gear wheels for ease of assembly.

Mounting plates 50 are attached to casing side parts 25 and 26 by means of screws 51. As may be seen particularly from FIG. 4, the head of screw 51 is countersunk in a bushing 52. Bushing 52, rigidly fastened to mounting plate 50, is filled with cement 53 after the mounting plate has been adjusted in place, to prevent screw 51 from working loose.

Figure 5:
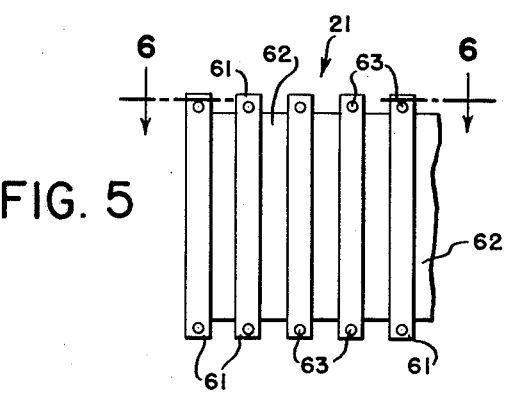
FIG. 5 is a front view of a particular embodiment of a louver shutter.
Figure 6:
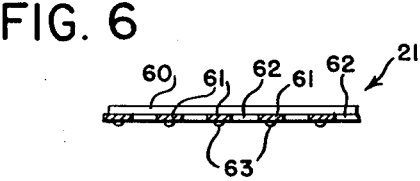
FIG. 6 is a section along line 6—6 in FIG. 5.
Figure 7:
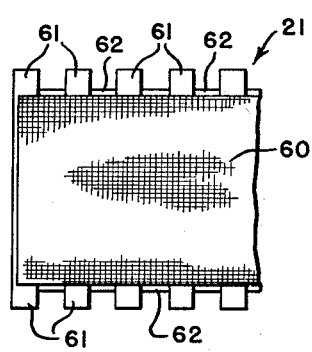
FIG. 7 is a rear view of the shutter of FIGS. 5 and 6.

The louver type covers employed according to FIGS. 1 to 7 are shown in FIGS. 5 to 7 on an enlarged scale. Louver slats 61 and 62 are cemented or welded to a flexible tape 60 made of plastic or cloth. Louver slats 61 and 62 are of approximately equivalent width but alternate slats 61 are made longer than intermediate louver slats 62. When fastened to the tape 60 their ends extend beyond the ends of louver slats 62. Teeth 59 of transport wheel 58 project into the edges of said covers in the gaps created by shorter slats 62. The extended ends of slats 61 project between said teeth 59 for moving the shutter upon rotation of the transport wheel.

The louvers may of course also be constructed so that the longer louver slats extend beyond the shorter ones in one direction only. For this case, the gear drive is provided only on one side of the binocular.

Louver slats 61 further comprise integral outwardly protruding dimples 63 which position the lens cover in its track. The dimples 63 hold the outer surfaces of the slats away from other components internal of the casings to prevent them from being scratched during opening and closing. Alternatively, of course, such dimples can be provided on the surfaces of the tracks along which the louver slats are guided.

Other types of lens covers may also be used, such as swinging or movable plates. For the gear drive described, an advantageous cover can comprise a movable belt. Such a cover belt may be made of a strong flexible material such as, for example, plastic webbing. The belt is made movable in front of the lens openings by means of a series of perforations in at least one longitudinal edge. The separations are spaced and dimensioned so as to engage the teeth of the transport wheel above described.

Internal tracks or guides are provided in the lens casings to position the lens covers along casing side parts 25 and 26 and front part 27. As shown in FIGS. 1 and 2 the guides comprise U-shaped brackets 70 and separating plates 75. Brackets 70 embrace the outer edges of the lens casings except at the viewing openings. They are bent at their edges 71 and fastened with screws 72 to casing side parts 25 and 26.

To reduce bulk to a minimum provision is made for the covers to become superimposed as they move into the open position at the casing edges. Separating plate 75, attached at one end to casing front part 27, is provided between the opened lens covers to prevent jamming or other interference in the opened position.

As the lens casings are moved outward from the resting position shown in FIG. 1, in which position the louvers are located in front of the viewing openings covering the lenses, the toothed working surfaces 42 of strips 40 set the pinions 45 with which they mesh in rotation. Pinions 45 comprise both gear teeth and a cam over separate peripheral portions. After pinion 45 has rotated through a prescribed arc, outer flat surface of cam 48 reaches glide plane 43 of strip 40 and slidably engages therewith preventing further rotation of pinion 45 and of all other gears of the transmission mechanism.

The rotation of the gear train members and consequently of the transport wheels 58 causes the louvers to be automatically moved by the teeth 59 of the transport wheels away from objective opening 15 and eyepiece opening 16 respectively (and reversely, of course, depending upon the direction of casing movement). Upon outward casing extension, the point of initial contact between cam 48 and glide plane 43 corresponds to the minimal interocular viewing separation distance of the binocular at which point the lens openings are fully exposed with the lens covers being fully opened. As the casings move onward from this point throughout the range of interocular viewing separation distances provided in the binocular, the flat surfaces of cams 48 slidably engage the described glide planes 43 preventing further rotation of pinions 45 and of the subsequent gear wheels. The covers are, thereby, locked in their opened positions throughout the range of casing viewing separations.

The described working surfaces of the strips 40 also comprise, intermediate of the glide plane 43 and teeth 42, a recessed gear tooth surface to engage positively with one side of the cam which is still rotating at that point, to preclude backlash.

Moreover, since the objective opening can be larger than the ocular opening, the cover for the ocular opening can be shorter than that for the objective opening. For this case the extent of the toothing 42 on the rack strips 40 can be shorter (the extent of the respective glide plane surfaces 43 being correspondingly longer) and pinions 45 on the ocular side are set to rotate through a smaller arc than pinions 45 on the objective side. In such cases, the transmission mechanism can be arranged so that the same type drives are used for both the objective and ocular openings, which makes for utmost simplicity of construction.

Of the remaining parts shown in the drawing and not as yet mentioned, numeral 80 designates a focusing wheel which is supported on casing support 10 and which, through means not shown, focuses the lens system, likewise not shown, for a given user of the binoculars. The covers of the lens casings are designated as 81.

Also screwed to the casing front parts 27 are racks 35 which mesh with a gear 38 arranged inside the central bridge support member 10. The racks 35 and gear 38, not a part of this invention, function to ensure that the casings will be, in any extended position, equidistantly separated from the binocular central plane.

Likewise, as shown in FIG. 2, lengthwise slots 36 disposed in racks 35 mate with stop pins 37. The stop pins 37 are attached to the central bridge support member 10 and engage the inner ends of slots 36 when the casings are in the full extended position, thereby precluding further extension.

Figure 8:
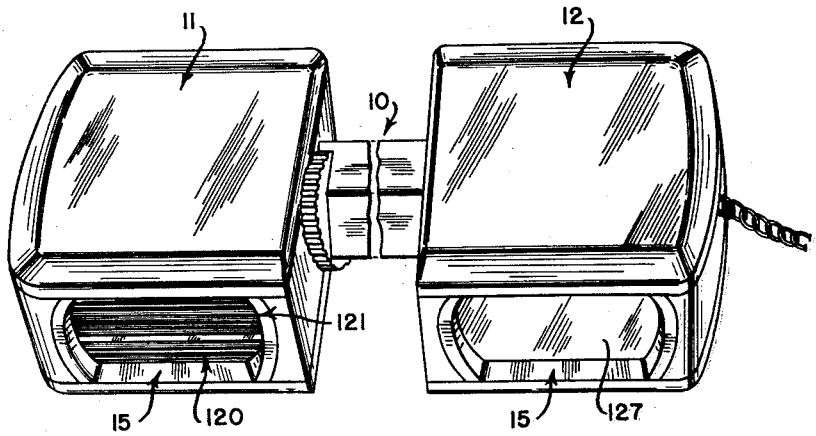
FIG. 8 is a pictorial representation of the binocular telescope showing another embodiment of the lens covers.
Figure 9:
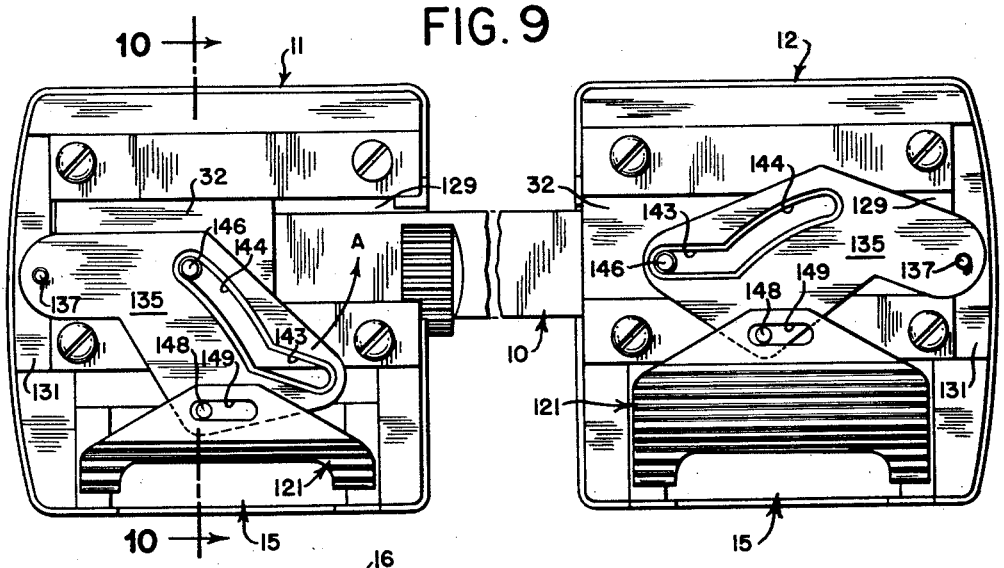
FIG. 9 is a representation of the binocular telescope according to FIG. 8, with the lens casing covers removed.
Figure 10:
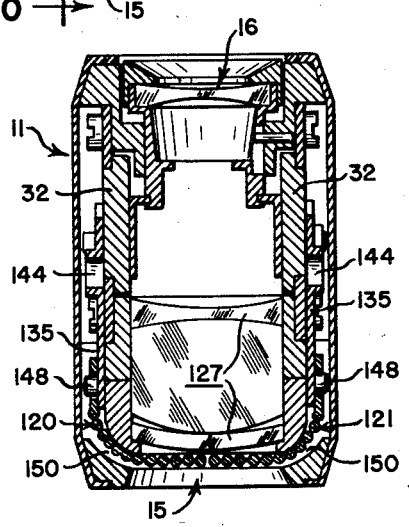
FIG. 10 is a section along line 10—10 in FIG. 9.

In the embodiment according to FIGS. 8, 9 and 10, the binocular telescope comprises a unitary support member 10 on which two lens casings 11 and 12 are movably arranged. FIGS. 8 and 9 show casing 11 in the resting position and casing 12 in the extended or operating position. The objective opening 15 of casing 11 is shown covered with a two-section louver shutter 120 and 121 wherein each section or shutter covers half of the lens therebeneath. The objective opening 15 of case 12 is shown exposed. In this embodiment, the louvered shutters are formed of slats disposed parallel to the plane of the binocular telescope optical axes.

Details of this construction are shown in FIGS. 9 and 10. The unitary support member presents at its end guide blocks 32 carried in ways 129 of casings 11 and 12. The said casing ways are closed off by cross pieces 131 in each casing. On both the top and bottom cross pieces 131, cam levers 135 are supported on pivots 137. The cam levers present control slots comprising an oblong portion 143 and a curved portion 144 in which a control pin 146 slides. The control pin is rigidly mounted at its inner end on the unitary support member.

In addition, attached to the cam levers 135 are drive pins 148 which project into the ends of the shutters. As may be seen in FIG. 9 drive slots 149 are disposed in the ends of the louvered shutters 120 and 121 parallel to the central bridge support member 10. Drive pins 148 are disposed projecting into said drive slots.

The louvered shutters in turn are supported and positioned by internal guides comprising guide slots or ways 150 (see FIG. 10) that are respectively arranged at the sides of objective openings 15 recessed in the lens casings. An eyepiece opening designated as 16 is recognizable in FIG. 10 only. The objective lens is shown as 127.

The principle of operation of the device is as follows:

When the binocular telescope is in its resting position, the lens casings are pushed together (as in FIG. 1) so as to touch each other, with the louvered shutters closed. This position is illustrated only by lens casing 11 in FIGS. 8 and 9. When the binocular is extended from the resting or carrying position to a viewing position, the two casings are pulled away from each other. In the process, control pins 146 first engage in curved slot portions 144, with the cam levers thereby being rotated on pivots 137 in the direction of arrow A (FIG. 9) and the louvered shutters being removed from the lens openings by drive pins 148, which engage the drive slots 149. When the control pins reach the outer end of the oblong slot portion, the lens openings are uncovered and the binoculars are ready for use. At that point, the lens casings are slightly separated at positions which correspond to the minimal interocular viewing separation distance of the binocular.

When the interpupillary accommodation distance is increased as the lens casings move throughout the range of interocular viewing positions, the louvered shutters remain open since the control pins then slide in the oblong slot portions 143. The oblong portions 143 are parallel to the unitary support member 10 and consequently parallel to the direction in which the casings move (see casing 12, FIG. 9) in the viewing positions.

For clarity, it should be noted that the length of oblong slot portions 143 is approximately equivalent to half of the total length of the range of interocular viewing separation distances of the binocular telescope.

When the lens casings are put back to the carrying or resting position the process is reversed, with the louvered shutters at first remaining open until control pins 146 travel into the curved slot portions. The cam levers 135 then rotate counter to direction A and the louvered shutters are closed by the drive pins 148 and slots 149.

This embodiment may, of course, also provide for similar automatic covering of the ocular lenses, in which case cam levers are made to move the covers for both the objectives and the oculars simultaneously. This can readily be achieved, for example, by appropriate arrangement of the control slots and pivot points or by use of separate cams.

Complete descriptions of the invention are given so that it may be thoroughly understood by those skilled in the art. However, it should be understood that changes from the details set forth may be made without departing from the invention. Accordingly, reference should be made to the subjoined claims in determining the full scope of the invention.

We claim:

1. In a binocular telescope having a pair of ocular-objective lens systems and two compact, generally rectangular, box-like lens casings slidably supported on a central support member, said lens systems being mounted in optical axis alignment in said lens casings, protective lens covers supported for slidable movement in guides disposed internally of said lens casings to position said lens covers adjacent said lenses, each of said covers being adapted to extend over the entire area of one lens in the closed position and to expose the same in the opened position and mechanism for actuating said lens covers including gear drives supported internally of and on said lens casings and supported on said central bridge to slidably open said covers upon slight movement of the lens casings on said support members during extension of said casings to provide interpupillary distance accommodation.

2. The binocular telescope combination of claim 1 in which each of said gear drives comprises a plurality of gear wheels including a transport wheel and a pinion, the gear wheels of each of said drives being supported as a unit on a mounting plate affixed internally of the sides of said lens casings, said gear wheels being adapted to rotate said transport wheel in response to rotation of said pinion, and a rack strip exposed in one said casings affixed on said central support parallel thereto, said strip and said pinion comprising over portions thereof a plurality of mating teeth, said teeth being disposed at one edge of said strip at the inner portions thereof, said teeth being disposed in said pinion over a portion of the periphery thereof, said edge comprising at its outer portion a glide plane surface, said pinion comprising over the remainder of said periphery a cam having a flat outer surface, said rack strip being adapted to cause rotation of said pinion upon slight opening of said lens casings on said support, said pinion being oriented with respect to said rack such that said flat cam surface abuts on said glide plane in all viewing positions of said binocular, said flat surface being slidable against said glide plane to inter-lock said gear wheels against rotation in said viewing positions.

3. In a binocular telescope having a pair of occular-objective lens systems and two compact, generally rectangular, box-like lens casings slidably supported on a central support member, said lens systems being mounted in optical axis alignment in said lens casings, protective lens covers supported for slidable movement in guides disposed internally said lens casings to position said lens covers adjacent said lenses, each of said covers being adapted to extend over the entire area of one lens in the closed position and to expose the same in the opened position and mechanism for actuating said lens covers including gear drives supported internally of and on said lens casings and supported on said central bridge to slidably open said covers upon slight movement of the lens casings on said support member during extension of said casings to provide interpupillary distance accommodation, said drives comprising rack strips and a plurality of gear wheels including transport wheels and pinions, said transport wheels comprising over their periphery a plurality of teeth to engage the edges of said lens covers.

4. The binocular telescope combination of claim 3 in which the protective lens covers comprise shutters which have a plurality of strong louver slats of alternate longer and shorter lengths arranged side by side and cemented at their inner faces to a strong flexible mounting tape with alternate longer slats extending beyond the ends of intermediate shorter slats at least on one edge of said shutters, said slats being disposed perpendicular of the plane of the binocular optical axes, the outer end surface of said alternate longer slats having small, integral, outwardly protruding dimples for spacing said shutters from said guides, the ends of said alternate longer slats being adapted to engage the said teeth of said transport wheels for opening and closing said covers.

5. The binocular telescope combination of claim 3 in which the said guides comprise U-shaped brackets and separator plates, one of said U-shaped brackets being disposed around the outer edges of each of said lens casings except at the viewing openings thereof immediately inside the casing outer walls, said brackets being attached at the side parts of said casings, one of said separator plates being disposed at the outer edge of the front parts of each casing immediately interior of said bracket, one end of said separator plates being attached to said casings whereby said covers can be moved and supported in said casings in all casings positions without jamming and interference.

6. In a binocular telescope having a pair of ocular-objective lens systems and two compact, generally rectangular, box-like lens casings slidably supported on a central support member, said lens systems being mounted in optical axis alignment in said lens casings, protective lens covers supported for slidable movement in guides disposed internally said lens casings to position said lens covers adjacent said lenses, each of said covers being adapted to extend over the entire area of one lens in the closed position and to expose the same in the opened position and mechanism for actuating said lens covers including cam and pin drives supported internally of and on said lens casings and supported on said central bridge to slidably open said covers upon slight movement of the lens casings on said support member during extension of said casings to provide interpupillary distance accommodation.

7. The binocular telescope combination of claim 6 in which said cam and pin drives comprise for each lens cover two flat cam levers which have control slots through the inner surfaces thereof, two control pins and two drive pins, said cam levers being supported on opposite sides of the binocular internal of said lens casings on pivots near the ends of said casings, said levers being disposed parallel to the plane of the binocular optical axes projecting inwardly of said binocular from the pivots aforesaid, said control pins being disposed internal of said binocular perpendicular to said plane on opposite sides of said central bridge, the inner ends of said control pins being rigidly affixed to said bridge, said pins being oriented with the outer portions thereof projecting into the said control slots, said control slots being continuous in each said lever and comprising curved portions and oblong portions, said control pins and curved portions being adapted to rotate said cam levers upon slight opening of said casings on said support, said oblong portions being disposed parallel to said central bridge when the binocular is in use, said levers being interlocked against rotation by said control pins and oblong portions in all viewing positions of said casings, each of said drive pins being disposed internal of said binocular perpendicular to said plane, the inner ends of said drive pins being rigidly affixed to the said cam levers, said drive pins being oriented projecting outwardly of said levers and adapted to engage the upper ends of said lens covers.

8. In a binocular telescope having a pair of ocular-objective lens systems and two compact, generally rectangular, box-like lens casings slidably supported on a central support member, said lens systems being mounted in optical axis alignment in said lens casings, protective lens covers supported for slidable movement in guides disposed internally said lens casings to position said lens covers adjacent said lenses, each of said covers being adapted to extend over the entire area of one lens in the closed position and to expose the same in the opened position and mechanism for actuating said lens covers including cam and pin drives supported internally of and on said lens casings and supported on said central bridge to slidably open said covers upon slight movement of the lens casings on said support members during extension of said casings to provide interpupillary distance accommodation, said drives comprising a plurality of cam levers, drive pins, and mutually engaging control slots and control pins supported interior of said lens casings, said drive pins being affixed to said cam levers and adapted to engage the ends of said lens covers.

9. The binocular telescope combination of claim 8 in which each of said lens covers comprise two movable shutters generally disposed on opposite sides of the binocular internal of said lens casings each of said shutters being of a size and dimension such that it can cover half of the exterior surface of the lens therebeneath in the closed position, each shutter comprising a plurality of strong louver slats disposed parallel to the plane of the binocular optical axes, a strong flexible tape upon which said slots are cemented, small integral dimples at the ends of said slats, said dimples being outwardly protruding of said slats for spacing said shutters from said internal guides, and oblong drive slots disposed parallel to said central bridge in the inner end slats of said shutters, said drive slots being adapted to engage said drive pins, for opening and closing said covers.

10. The binocular telescope combination of claim 8, in which said guides comprise ways disposed internal of the said lens casings said ways being recessed in the said casings at the outer edges of the lens viewing openings whereby said covers can be moved and supported in said casings in all casing positions without jamming and interference.

11. In a binocular telescope having a pair of ocular-objective lens systems and two compact generally rectangular box-like lens casings slidably supported on a central support member, said lens systems being mounted in optical axis alignment in said lens casings, protective lens covers supported for slidable movement in guides disposed internally of said lens casings to position said lens covers adjacent said lenses, means carried internally by said lens casings for cooperatively engaging means attached to said support for actuating said lens covers to expose the lenses of said lens systems upon transverse slidable movement of said lens casings relative to said support member during interpupillary distance accommodation, said actuating means moving said covers to cover the lenses of said lens systems upon sliding movement of said lens casings relative to said support member to closed positions.

References Cited in the file of this patent

UNITED STATES PATENTS

| 1,024,730 | Levy | Apr. 30, 1912 |
| 2,814,967 | Haeseler | Dec. 3, 1957 |

FOREIGN PATENTS

| 727,177 | Germany | Oct. 28, 1942 |